United States Patent Office 3,454,349
Patented July 8, 1969

3,454,349
CELLULOSE ESTER SHAPED ARTICLES OF IMPROVED DYEABILITY
Charles L. Smart, Millington, N.J., assignor to Celanese Corporation, New York, N.Y., a corporation of Delaware
No Drawing. Filed Dec. 28, 1965, Ser. No. 526,005
Int. Cl. D06p *3/34;* D01f *3/00*
U.S. Cl. 8—4    12 Claims

ABSTRACT OF THE DISCLOSURE

A shaped article comprising a cellulose ester of a fatty acid containing fewer than about 0.29 free hydroxyl groups per anhydroglucose unit in the cellulose molecule, containing throughout its cross-section and physically mixed with the cellulose ester a preformed polymer of a major amount of vinyl acetate.

This invention relates to the production of shaped articles of certain cellulose esters having improved properties.

Cellulose esters of low hydroxyl content, e.g. cellulose triacetate, possess certain desirable properties which make them useful when formed into shaped articles such as filamentary material and films but which are relatively difficult to dye. For example, it is difficult to dye filamentary material of these cellulose esters by means of the standard dyeing procedures applied to more easily dyed materials such as wool, cotton and cellulose secondary acetate. This is especially true when the so-called "disperse" dyes which are ordinarily applied to cellulose secondary acetate are being used.

It is an object of this invention to provide improved shaped articles such as filamentary material and films of cellulose esters of low hydroxyl content. It is a further object of this invention to provide filamentary materials of these cellulose esters which are more easily dyed with disperse dyes. Other objects will become apparent from the following detailed description and claims.

In accordance with one aspect of the invention, a cellulose ester of low hydroxyl content, e.g. cellulose triacetate, is formed into shaped articles, e.g. filamentary material or films, in the presence of a preformed polymer of a major amount of vinyl acetate, which has the effect of improving the dyeability of the cellulose. Preferably, the cellulose ester is formed into filaments or films by means of dry extrusion techniques, e.g. dry spinning, in which case the vinyl acetate polymer may be incorporated into the spinning solution. When the filamentary material is prepared by means of this technique the additive is present substantially throughout the cross-sections of the individual filament.

The vinyl acetate polymer additive contains a major amount, i.e. more than 50% by weight of polymerized vinyl acetate, and may be a homopolymer, i.e. polyvinyl acetate or a copolymer of vinyl acetate with a minor amount of a comonomer such as a lower alkyl acrylate or methacrylate, e.g. methyl acrylate or methyl methacrylate, styrene, vinyl chloride, vinyl stearate, diethyl maleate, or the vinyl sulfonic acid sodium or potassium salt.

The vinyl acetate polymer may have a molecular weight expressed as inherent viscosity or viscosity of a solution of the polymer in a standard solvent at standard concentration, and a softening point in the widest possible ranges. For example, the polymer may have an inherent viscosity of 0.01 to 16.0, a relative viscosity of 0.5 to 1000 centipoises (solution of 86 grams of polymer in 1000 cc. of benzene at 20° C.), and a softening point of 0 to 250° C.

The vinyl acetate polymer may be used, for example, in the range of 3 to 15 wt. percent, preferably 5 to 10 wt. percent based on the weight of the solvent with the cellulose ester in forming a spinning solution or dope for dry spinning or casting.

It is critical to this invention that a preformed vinyl acetate polymer be added to the cellulose ester, rather than forming such polymer by polymerizing vinyl acetate in the presence of the cellulose ester. The reason for this is that if vinyl acetate is polymerized in the presence of the cellulose ester such as cellulose triacetate, the resulting mass is apparently a graft or block polymer of the cellulose ester and vinyl acetate rather than the physical mixture of polymers contemplated herein, and such graft or block polymer does not have the properties of the original cellulose ester. For example, when vinyl acetate is polymerized in the presence of cellulose triacetate, the resulting polymer is substantially soluble in acetone, whereas the cellulose triacetate in a mixture formed by adding preformed polyvinyl acetate to cellulose triacetate remains substantially insoluble in acetone.

The cellulose ester of low hydroxyl content is preferably a cellulose ester of a fatty acid such as acetic, formic, propionic, butyric and the like which contains fewer than about 0.29, and preferably fewer than about 0.12 free hydroxyl groups per anhydroglucose units in the cellulose molecule. A particularly important material within this group is cellulose triacetate containing more than 59% and preferably more than 61% of acetyl groups calculated as combined acetic acid.

In general filamentary material or films of a cellulose ester of low hydroxyl content containing a vinyl acetate polymer have substantially improved dyeability with disperse dyes as indicated by an increased dyeing rate and a higher rate of practical dye exhaustion. For example, as expressed quantitatively, the additive-containing filamentary material of this invention will take up at least 10%, generally 10 to 100% more dye based on the weight of the filamentary material when dyed for at least ¼ hour, preferably ½ to 8 hours in a standard aqueous dye bath than a substantially identically prepared and treated material but containing no vinyl acetate polymer which is dyed with the same dye bath in substantially the same manner.

The standard dyebath may contain, for example ½ to 8% based on the weight of fabric or fiber sample (OWF) of a disperse dye of the class well-known in the art to be suitable for the dyeing of cellulose secondary acetate, such as Interchemical Blue GSF, Interchemical Yellow HDLF, Eastone Red NGLF, Eastman Blue B–GLF, Eastman Red 2G, or mixtures thereof.

The liquor to filamentary material in the dyebath may vary, for example, from 20:1 to infinity, preferably from 50:1 to 100:1, and the dyeing temperature from 80 to 100° C.

In addition to the above improvement in dyeability, the additive containing filamentary material, preferably after being changed to an annealed or crystallized state, e.g. by a heat treatment, has a safe-ironing temperature equivalent to that of substantially identically prepared and treated material containing no additive, and is preferably equal to that of the non-additive containing material. In many cases the safe-ironing temperature of fabrics is preferably not less than 210° C. and the sticking temperature of films is not less than about 200° C.

In addition to the improved dyeing rate achieved by the vinyl acetate polymer-containing cellulose ester of this invention, the dyeing of shaped articles composed of such composition may be carried out to greater practical dye bath exhaustion and with better balance of dye exhaustion than are obtained with the dyeing of shaped articles composed of unmodified cellulose esters.

The advantages of this invention are not limited to an improvement in dyeability of the shaped article. Thus, the incorporation of a vinyl acetate polymer into the cellulose ester of low hydroxyl content also results in an improvement in various properties of the dyed and undyed article. For example, the following properties of the dyed and/or undyed article are obtained when a vinyl acetate polymer is incorporated in the cellulose ester, as compared with an identically produced article containing no vinyl acetate polymer:

Less shade change of the dyed material on heat treatment
Lower temperature needed for heat treatment
Greater "O" fading resistance of the dyed material, i.e., resistance to fading caused by ozone
Better washfastness of printed materials Moreover, the foregoing improvements are not obtained at the expense of various other properties which are important to the performance of the shaped article. Thus, the following properties of articles prepared from a vinyl acetate polymer-containing cellulose ester of low hydroxyl content are substantially equal to such properties of an identically prepared article composed of the same cellulose ester without any vinyl acetate polymer incorporated therein (control):

Dimensional stability of dyed article in jig
Wash and dry cleaning fastness after heat treatment
Gas fading resistance of the dyed material, i.e. resistance to fading caused by various nitrogen oxides in the atmosphere
Light fastness of the dyed material
Whiteness of the undyed material obtained with various bleaches, e.g. Textone or peroxide
Whiteness retention of the undyed material on heat treatment
Actinic degradation Finally, the mechanical properties of the material containing a vinyl acetate polymer are only very slightly changed over such properties of a control material, and such change does not affect the utility of the material.

The invention will now be further illustrated by the following examples in which all percentages are by weight unless otherwise indicated.

EXAMPLE I

In each of the examples the results obtained from various tests carried out on additive-containing yarn are compared with those obtained from the same tests carried out on a substantially identically prepared yarn of the same material which contains no additive.

Cellulose triacetate containing 61.7% of acetyl groups calculated as combined acetic acid and polyvinyl acetate as additive were dissolved in a solvent consisting of 91% methylene chloride and 9% of methanol by volume to yield a clear spinning dope containing 21.4% of cellulose triacetate and 2.14% of polyvinyl acetate based on the weight of the solution. The added polyvinyl acetate had an inherent viscosity of 0.12, a "viscosity" of 1.4–1.7 centipoises and a softening point of 65° C. The dope was dry spun through a spinneret containing 20 holes of 0.034 mm. diameter, having a jet face temperature of 69–90° C. into a spinning cabinet using 15 cubic feet/min. of air updraft and was taken up at a spinning speed of 500 meters/min. to yield a 20 filament yarn of 75 denier and containing 10% of polyvinyl acetate based on the weight of the cellulose triacetate. The individual filaments were thus 3.75 denier.

The yarn was woven into a 180 x 58 taffeta containing said yarn with 2 twists per inch as warp and 2 plies of such yarn as filling. The fabric was scoured at 70° C. for ½ hour in a scour bath containing 2 grams per liter of "Tanapon X–70" surface active agent and 0.5 gram per liter of "Calgon" (sodium hexametaphosphate). The scoured sample was then rinsed in distilled water at 23° C. and air dried.

The fabric was dyed in a standard aqueous dyebath containing 1 gram per liter of Interchemical Acetate Yellow HDLF–40 (prototype 625, CI, Second Edition, Part II No. 10338) and 0.5 gram per liter of "Igepon T–77" surface active agent $(C_{17}H_{33}CON(CH_3)C_2H_4SO_3Na)$. The dyebath contained 4% of dye based on the weight of the fabric and the liquor to fabric ratio on a weight basis was 40:1.

The dyeing was carried out by agitating the fabric sample with the dye bath in an Atlas Launderometer for 90 minutes as described in the 1958 edition of the Technical Manual and Yearbook of the American Association of Textile Chemists and Colorists, pages 83 and 84.

After washing and drying, the fabric was found to contain about 3.0% of dye based on the weight of the fabric determined by conventional methods of colorimetry after dissolving the dyed sample in an appropriate solvent, i.e. 91% methylene and 9% methanol by volume.

A sample was prepared and treated as described previously except that no polyvinyl acetate was incorporated into the spinning dope. When this sample (hereinafter referred to as the "control") was dyed as described in this example, the dye take-up was found to be 2.7%.

EXAMPLE II

The procedure of Example I was repeated except that the dye employed was Eastone Red N–GLF (Prototype No. 620, Colour Index, second edition, Part I Disperse Red 35). The dye take-up was found to be 3.1% based on the weight of the fabric.

When a control sample was dyed with the dye of this example, the dye take-up was found to be 2.2% based on the weight of the fabric sample (OWF).

EXAMPLE III

The procedure of Example I was repeated except that the dye employed was Eastman Fast Blue B–GLF (Colour Index, second edition, Part II No. 60767). The dye take-up was found to be 3.9% based on the weight of the fabric. The dye take-up of the control sample was 2.8%.

EXAMPLE IV

The procedure of Example I was repeated except that the dye employed was Interchemical Acetate Blue GSF (Prototype 624) and the dyeing time was 2 hours. The dye take-up was 2.5% based on the weight of the fabric sample.

When a control sample was dyed with the procedure of this sample, the dye take-up was 2.0% based on the weight of the sample.

The increased dye take-up obtained as a result of the process and product of this invention is not obtained at the expense of various properties of the dyed product. Thus, such dyed products have satisfactory washfastness, resistance to dry cleaning, and lightfastness. This is illustrated by various standard tests for these properties which were carried out on the samples and controls of Examples I to IV and are described by the American Association of Textile Chemists and Colorists (AATCC). The results of these tests are shown in Table I and represent units of the International Grey Scale Rating of Color Change (IGS) in which 5 represents substantially no change and 1 represents a substantial change, which also includes the values for dye take-up given in the foregoing examples.

TABLE 1

| | Dye takeup, percent o.w.f. | Washfastness Test No. 3 (160° F.) | | Dry cleaning (115° F.) | | Lightfastness, 20 hrs. exposure |
|---|---|---|---|---|---|---|
| | | Sample | Staining of bath | Sample | Staining of bath | |
| Ex. I | 3.0 | 4-5 | None | 5 | None | 5 |
| Control | 2.7 | 4-5 | L-M | | | |
| Ex. II | 3.1 | 4-5 | None | 5 | do | 5 |
| Control | 2.2 | 4-5 | L-M | | | |
| Ex. III | 3.9 | 4-5 | None | 5 | do | 5 |
| Control | 2.8 | | | | | |
| Ex. IV | 2.5 | 4-5 | L | 5 | Slight | 4-5 |
| Control | 2.0 | 4-5 | L-M | | | 4-5 |

L=light, M=medium.

The tests used to obtain the results in Table 1 are described in the Technical Manual and Year Book of the American Association of Textile Chemists and Colorists for the year 1965, the washfastness test No. 3 (160° F.) being described on pages B-86 and B-87, the lightfastness test at 20 hours exposure being described on pages B-70, B-71, and B-72, and the dry cleaning test (115° F.) described at pages B-66 and B-67.

Heat setting of the dyed samples at a temperature of 400° F. for a period of 2 minutes yields various improvements in certain properties, e.g. safe ironing temperature, as compared with dyed samples which are not heat set.

The improved dye take-up achieved as a result of this invention is not accompanied by a major sacrifice of the mechanical properties of the shaped article. This is illustrated by the results shown in Table 2 of various tests carried out on filaments containing 10% of polyvinyl acetate (PVAc) prepared as described in Example I as compared with control filaments prepared in exactly the same way but not containing any polyvinyl acetate. Tests were carried out on undyed samples using a standard Instron Tensile Tester at 23° C. and 65% relative humidity (R.H.), unless otherwise stated.

TABLE 2

| | Containing 10% PVAc | Control |
|---|---|---|
| Tenacity, grams/denier | 1.29 | 1.31 |
| Elongation, percent | 32 | 36 |
| Tenacity, wet at 95° C., grams/denier | 0.44 | 0.45 |
| Elongation, wet at 95° C., percent | 73 | 71 |
| Work recovery, 5% extension, percent | 14 | 12 |
| Permanent set, 5% extension, percent | 48 | 50 |
| Work recovery, 10% extension, percent | 6 | 6 |
| Permanent set, 10% extension, percent | 71 | 72 |

In addition to the favorable properties illustrated in Tables 1 and 2, the product of this invention has a safe ironing temperature and, when dyed, a resistance to fading by ozone (O fading) and a resistance to fading by nitrogenous gases (gas-fading) which are substantially equivalent to such properties as the control material, i.e., containing no polyvinyl acetate, while at the same time having much better dyeability.

The advantages of this invention are not limited to filamentary material as the shaped article, but are also obtained with other shaped articles such as films. This is illustrated by the following examples.

EXAMPLE V

A casting solution was prepared by dissolving 18% based on the weight of the solution of the cellulose triacetate described in Example I and 2% by weight of the solution of polyvinyl acetate having an inherent viscosity of 0.06. The solution was cast on a cold glass plate to form a film. A 2" by 2" sample of this film was first dyed by boiling for one hour in 100 milliliters of a dye solution containing 19 grams of Eastman Blue BNN (Colour Index, second edition, Part II No. 61505), 19 grams of "Igepon T-77" surface active agent, 19 grams of "Calgon," and 2000 cc. of water. The dyed clear films were exhaustively washed in warm water, blotted between paper towels and dried at 60° C.

The dyed film was found by a standard colorimetry method to contain 3.05% based on the weight of the film.

EXAMPLE VI

The procedure of Example V was repeated except that the casting solution contained 19% of cellulose triacetate and 1% of the polyvinyl acetate based on the weight of the solution. The dyed film was found to contain 1.72% of dye.

EXAMPLE VII

The procedure of Example V was repeated except that the polyvinyl acetate used had an inherent viscosity of 0.13. The dyed film was found to contain 3.75% of dye based on the weight of the film.

EXAMPLE VIII

The procedure of Example V was repeated except that the casting solution contained 10% of cellulose triacetate and 10% of polyvinyl acetate having an inherent viscosity of 0.13 based on the weight of the solution. The dyed film was found to contain 3.86% based on the weight of the film.

As a control, the procedure of Example V was repeated except that the casting solution contained 20% of cellulose triacetate and no polyvinyl acetate at all. The dyed film was found to contain only 0.76% of dye based on the weight of the film.

The product of this invention has the same utility that cellulose triacetate of commerce has. Thus, filamentary material produced in accordance with this invention may be used in apparel, e.g. blouses, skirts and lingerie, and in home furnishings such as drapes, upholstery fabrics and carpet.

The values of inherent viscosity of vinyl acetate polymer given in the examples were determined from a solution of 0.1 gram of polymer in 100 ml. of acetone at 25° C. The ranges of inherent viscosity of vinyl acetate polymer set out in the general disclosure are based on the same method of determination.

The "viscosity" of the polyvinyl acetate used in Examples I to IV is that of a benzene solution containing 86 grams of polymer per 1000 cc. of solution determined at 20° C. with an Ostwald viscosimeter. The softening point of this polyvinyl acetate was determined by a modified Kraemer and Sarnow method using 10 grams of mercury over a 0.25 inch cylindrical plug of polymer in a 7 millimeter glass tube.

It is to be understood that the foregoing detailed description is given merely by way of illustration, and that many variations may be made therein without departing from the spirit of my invention.

The embodiments of the invention in which an exclusive property or privilege is claimed are defined as follows:

1. A shaped article of a cellulose ester of a fatty acid containing fewer than about 0.29 free hydroxyl groups per anhydroglucose unit in the cellulose molecule and containing throughout its cross-section and physically mixed with said cellulose ester a preformed polymer of a major amount of vinyl acetate.

2. The product of claim 1 wherein said cellulose ester is cellulose triacetate.

3. The product of claim 2 wherein said shaped article is filamentary material.

4. The product of claim 3 wherein said vinyl acetate polymer is a homopolymer of vinyl acetate.

5. The product of claim 4 wherein said homopolymer of vinyl acetate is present in an amount of 3 to 15% by weight of said cellulose triacetate.

6. The product of claim 5 dyed with a disperse dye.

7. A process comprising dissolving a cellulose ester of a fatty acid containing fewer than about 0.29 free hydroxyl groups per anhydroglucose unit in the cellulose molecule and a preformed polymer of a major amount of vinyl acetate in a volatile solvent to form a solution, and extruding said solution into an evaporative atmosphere for said solvent to form a shaped article comprising said cellulose ester with said preformed vinyl acetate polymer distributed throughout the cross-section of said shaped article and in physical mixture with said cellulose ester.

8. The process of claim 7 wherein said cellulose ester is cellulose triacetate.

9. The process of claim 8 wherein said shaped article is filamentary material.

10. The process of claim 9 wherein said vinyl acetate polymer is a homopolymer of vinyl acetate.

11. The process of claim 10 wherein said homopolymer of vinyl acetate is dissolved in said solvent in an amount of 3 to 15% based on the weight of said cellulose triacetate.

12. The process of claim 11 wherein said solvent comprises a major amount of methylene chloride and a minor amount of methanol.

References Cited

UNITED STATES PATENTS

| 2,402,942 | 7/1946 | Bludworth | 260—17 |
| 2,784,052 | 3/1957 | Jacobson | 260—17 |
| 2,892,672 | 6/1959 | Conciatori et al. | 260—17 |

WILLIAM H. SHORT, *Primary Examiner.*

L. M. PHYNES, *Assistant Examiner.*

U.S. Cl. X.R.

8—57; 260—17; 264—78, 187, 207